(12) United States Patent
Braunberger

(10) Patent No.: US 8,972,712 B2
(45) Date of Patent: Mar. 3, 2015

(54) DEVICE FOR REPROGRAMMING AN EMBEDDED SYSTEM TO ALLOW THE SYSTEM TO RETURN TO AN INITIAL EMBEDDED SYSTEM INFORMATION OR A REPROGRAMMED EMBEDDED SYSTEM INFORMATION

(75) Inventor: Beau M. Braunberger, Upland, CA (US)

(73) Assignee: Vision Works IP Corporation, Sequim, WA (US)

( * ) Notice: Subject to any disclaimer, the term of this patent is extended or adjusted under 35 U.S.C. 154(b) by 290 days.

(21) Appl. No.: 13/476,660

(22) Filed: May 21, 2012

(65) Prior Publication Data

US 2012/0303946 A1 Nov. 29, 2012

Related U.S. Application Data

(60) Provisional application No. 61/489,580, filed on May 24, 2011.

(51) Int. Cl.
*G06F 1/24* (2006.01)
*G06F 9/00* (2006.01)
*G06F 9/44* (2006.01)

(52) U.S. Cl.
CPC ................ *G06F 9/00* (2013.01); *G06F 9/4411* (2013.01)
USPC ........................................................ 713/100

(58) Field of Classification Search
CPC .................................................... G06F 9/4411
See application file for complete search history.

(56) References Cited

U.S. PATENT DOCUMENTS

| | | | | |
|---|---|---|---|---|
| 5,278,759 A * | 1/1994 | Berra et al. | ........................ | 701/1 |
| 5,541,840 A * | 7/1996 | Gurne et al. | .................. | 701/29.3 |
| 6,571,191 B1 * | 5/2003 | York et al. | ..................... | 702/107 |
| 7,068,147 B2 * | 6/2006 | Suganuma et al. | .......... | 340/5.74 |
| 2010/0262334 A1 * | 10/2010 | Yoshiyama | ...................... | 701/33 |
| 2011/0257810 A1 * | 10/2011 | Leger | ................................ | 701/1 |

* cited by examiner

*Primary Examiner* — Jaweed A Abbaszadeh
*Assistant Examiner* — Gayathri Sampath
(74) *Attorney, Agent, or Firm* — Haverstock & Owens LLP

(57) ABSTRACT

A reprogramming device is used for reprogramming embedded systems. The reprogramming device comprises a microprocessor, a memory programmed with software to accomplish the reprogramming of distinctly different embedded systems architectures, and one or more hardware devices that facilitate communication over multiple protocols contained in a portable package designed for both one-time and multi-occurrence use scenarios. In some embodiments, the reprogramming device is able to be used to enhance one or more attributes of performance of existing embedded systems through the reconfiguration of internally stored parameters. In some embodiments, the reprogramming device is also to be used to extract and receive information and instruction from existing embedded systems and enable useful presentation of this information. As a result, the reprogramming device is able to be used to adjust and/or monitor the parameters of the on-board diagnostics computer of a vehicle to ensure peak performance and detect errors.

30 Claims, 3 Drawing Sheets

DEVICE FOR REPROGRAMMING AN EMBEDDED SYSTEM TO ALLOW THE SYSTEM TO RETURN TO AN INITIAL EMBEDDED SYSTEM INFORMATION OR A REPROGRAMMED EMBEDDED SYSTEM INFORMATION

CROSS-REFERENCE TO RELATED APPLICATION

This application claims the benefit of U.S. Provisional Patent Application Ser. No. 61/489,580, filed May 24, 2011 and titled, "METHOD AND APPARATUS FOR EMBEDDED SYSTEMS REPROGRAMMING," which is hereby incorporated by reference in its entirety for all purposes.

FIELD OF THE INVENTION

The present invention relates to the field of reprogramming. Specifically, the present invention relates to the field of reprogramming embedded systems.

BACKGROUND

Currently, most vehicles include embedded on-board computing systems for controlling various parameters related to the performance of the vehicle. However, often these embedded computing systems fail to provide a user interface or other means for adjusting the initial state of the parameters of the on-board computing system. As a result, a user is unable to selectively adjust the systems to meet their particular needs.

SUMMARY OF THE INVENTION

A reprogramming device is able to be used in reprogramming embedded systems, including but not limited to both microprocessors and integrated memory storage devices. The reprogramming device comprises a microprocessor, a memory programmed with software to accomplish the reprogramming of distinctly different embedded systems architectures, and one or more hardware devices that facilitate communication over multiple protocols contained in a portable package designed for both one-time and multi-occurrence use scenarios. In some embodiments, the reprogramming device is able to be used to enhance one or more attributes of performance of existing embedded systems through the reconfiguration of internally stored parameters. In some embodiments, the reprogramming device is also to be used to extract and receive information and instructions from existing embedded systems and enable useful presentation of this information. As a result, the reprogramming device is able to be used to adjust and/or monitor the parameters of the on-board diagnostics computer of a vehicle to ensure peak performance and detect errors.

In one aspect, a device for reprogramming an embedded system on a vehicle. The device comprises a memory for storing an application, the application configured for presenting a user interface configured for displaying embedded system information and receiving an instruction, extracting the embedded system information contained on the embedded system, sending the instruction to the embedded system and reprogramming the embedded system information on the embedded system with the instruction and a processing component coupled to the memory, the processing component configured for processing the application. The application utilizes an embedded system interface for sending the instruction to the embedded system and extracting the embedded system information. The application is further for increasing transaction capabilities between the embedded system and the device for reprogramming. The device is portable. The device is releasably coupled to the embedded system. The device is permanently coupled to the embedded system. The embedded system comprises a motorcycle on-board computing system. The embedded system information is selected from the group consisting of horsepower, speed, rpm, torque, fuel economy parameters, emissions parameters and internally stored variables. The application is further for writing a unique identification code to the embedded system to allow an initial reprogramming and preventing any additional reprogramming except to return the embedded system to an initial state or a reprogrammed state. The application is further for modifying a boot loader of the embedded system to accept larger amounts of data per singular write event. The application is further for temporarily increasing a baud rate communication speed during a reprogramming event. The application is further for reducing required instances of verification of received information. The application is further for altering checksum calculation routines to accept longer write streams between checksum calculations during reprogramming.

In another aspect, a device for reprogramming an embedded system on a vehicle. The device comprises a memory for storing an application, the application configured for presenting a user interface configured for displaying embedded system information and receiving an instruction, increasing transaction capabilities between the embedded system and the device for reprogramming, extracting the embedded system information contained on the embedded system using an embedded system interface, sending the instruction to the embedded system using the embedded system interface, reprogramming the embedded system information on the embedded system with the instruction and a processing component coupled to the memory, the processing component configured for processing the application. The device is portable. The device is releasably coupled to the embedded system. The device is permanently coupled to the embedded system. The embedded system comprises a motorcycle on-board computing system. The embedded system information is selected from the group consisting of horsepower, speed, rpm, torque, fuel economy parameters, emissions parameters and internally stored variables. The application is further for writing a unique identification code to the embedded system to allow an initial reprogramming and preventing any additional reprogramming except to return the embedded system to an initial state or a reprogrammed state. The application is further for modifying a boot loader of the embedded system to accept larger amounts of data per singular write event. The application is further for temporarily increasing a baud rate communication speed during a reprogramming event. The application is further for reducing required instances of verification of received information. The application is further for altering checksum calculation routines to accept longer write streams between checksum calculations during reprogramming.

In another aspect, a method of reprogramming an embedded system on a vehicle, the method programmed in a memory of a reprogramming device. The method comprises presenting a user interface configured for displaying embedded system information and receiving an instruction, increasing transaction capabilities between the embedded system and the reprogramming device, extracting the embedded system information contained on the embedded system using an embedded system interface, sending the instruction to the embedded system using the embedded system interface and reprogramming the embedded system information on the embedded system with the instruction. The device is portable. The device is releasably coupled to the embedded system. The device is permanently coupled to the embedded system. The embedded system comprises a motorcycle on-board computing system. The embedded system information is selected from the group consisting of horsepower, speed, rpm, torque, fuel economy parameters, emissions parameters and internally stored variables. The method further comprises writing a unique identification code to the embedded system to allow an initial reprogramming and preventing any additional reprogramming except to return the embedded system to an initial state or a reprogrammed state. The method further comprises modifying a boot loader of the embedded system to accept larger amounts of data per singular write event. The method further comprises temporarily increasing a baud rate communication speed during a reprogramming event. The method further comprises reducing required instances of verification of received information. The method further comprises altering checksum calculation routines to accept longer write streams between checksum calculations during reprogramming.

DETAILED DESCRIPTION

A reprogramming device, system and method for use in reprogramming embedded systems is described herein. Specifically, the reprogramming device is able to reprogram microprocessors and/or integrated memory storage devices such as vehicle on-board computer systems. As a result, the reprogramming device enables a user to monitor and/or adjust parameters of the embedded systems. For example, utilizing the reprogramming device a motorcycle user is able to couple the reprogramming device to a motorcycle's on-board computer and adjust the parameters in order to increase the performance of the motorcycle. In some embodiments, the reprogramming device is modular such that it is able to selectively couple to multiple different systems such as multiple different types and models of vehicles. Alternatively, the reprogramming device is able to be permanently coupled to a single embedded system such that a user is able to adjust the performance of the system to suit their needs.

Figure 1:
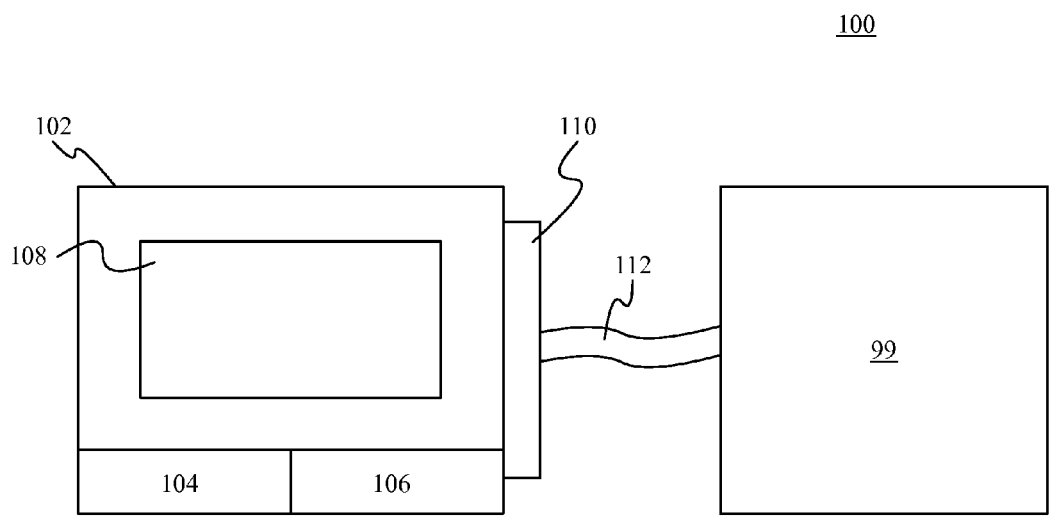
FIG. 1 illustrates a reprogramming system according to some embodiments.

As shown in FIG. 1, a reprogramming system 100 comprises a portable reprogramming device 102 coupled to one or more embedded computing systems 99. In some embodiments, the reprogramming device 102 is permanently coupled to the computing systems 99. Alternatively, the device 102 is able to be selectively, releasably, wired and/or wirelessly coupled. In some embodiments, the computing systems 99 are a part of a motorcycle on-board computing system. Alternatively, the computing systems 99 are able to be part of other vehicles or other types of embedded systems as are well known in the art.

In some embodiments, the reprogramming device 102 comprises a microprocessor 104, a memory 106, a user interface 108 and an embedded system interface 110. The memory 104 stores and/or is programmed with software such as a reconfiguration module to be processed by the processor 104 to accomplish the reprogramming of distinctly different embedded systems architectures as described in detail below. The user interface 108 is able to comprise a display and one or more input devices for displaying the monitored parameters of the system 99 and providing an interface where the user is able to adjust said parameters by inputting commands into the interface 108. In some embodiments, the user interface 108 is able to be external or omitted from the reprogramming device 102 such that the device 102 couples to the user interface 108 when in operation. The embedded system interface 110 is able to couple to one or more different systems 99 for receiving input from and outputting data to coupled embedded systems 99 during operation of the reprogramming device 102.

In some embodiments, the reprogramming device 102 further comprises additional hardware devices 112 to facilitate communication over multiple protocols contained in a portable package designed for both one-time and multi-occurrence use scenarios. In some embodiments, the hardware devices 112 comprise hardware connectors for connecting to the embedded systems 99 as described below. Alternatively, other hardware devices 112 for communicating with multiple systems 99 using multiple different protocols is envisioned. As a result, the reprogramming device 102 is able to be used to enhance one or more attributes of performance of existing embedded systems through the reconfiguration of internally stored parameters. Additionally, in some embodiments, the reprogramming device 102 is also to be used to extract and receive information and instructions from existing embedded systems 99 and enable useful presentation of this information via the user interface 108. In some embodiments, the presentation of the information via the user interface 108 includes formatting the data to increase user-readability.

The reprogramming device 102 comprises a reconfiguring module that reconfigures the existing parameters of a separate embedded system in order to enhance one or more attributes of the separate embedded system's 99 performance, or the performance of objects within the separate embedded system's 99 control, including but not limited to: increasing horsepower, speed, rpm, torque, or other measures of generated power on motor vehicles; increasing fuel economy, reducing emissions, or increasing other measures of efficiency of motor vehicles; enabling the extraction of stored information, current operating parameters, internally stored variables, or providing access to other sources of useful information within the embedded system. In some embodiments, the reconfiguring module 102 is stored on the memory 106 and processed by the processor 104.

The reprogramming device 102 is able to be designed for multiple configurations. In some embodiments, the reprogramming device 102 is able to be used as single instance and then discarded. For example, the reconfiguring module of the reprogramming device 102 is able to be configured to write a unique identification code to the embedded system in order to allow an initial reprogramming, after which the reprogramming device 102 will no longer reprogram any other embedded system 99, except to return the initial system to its original programming state having the initial values/setting for each of the parameters. As a result, the reprogramming device 102 enables the intended user to alternate between the modified system and original system, while preventing the reprogramming device 102 from being used on multiple different systems. In some embodiments, after the first use of the reprogramming device 102, a flag is set to prevent the reprogramming device to be used to reprogram a second device. Any other implementations are possible to limit the use of the reprogramming device 102.

In some embodiments, the reprogramming device 102 is able to be used multiple times, either for the same purpose on one or more embedded systems 99, or for several different applications on one or more different embedded systems 99. In some embodiments, the reprogramming device 102 is temporarily connected to the embedded system 99, and externally powered through the use of wall mounted inverters, or clip on power leads, for the purpose of reprogramming or extracting a specific amount of data from the system 99. Alternatively, other external and/or internal power sources are envisioned as are well known in the art. In some embodiments, the reprogramming device 102 will remain permanently, or semi-permanently installed on the embedded system in a hard wired configuration for the purpose of continuous, periodic and/or selective reprogramming and adjustment, and for monitoring and extraction of a continuous data-stream from the embedded system 99. In some embodiments, during the first use of the reprogramming device 102, the reprogramming device 102 receives an identification number of the embedded system 99, so that the reprogramming device 102 is only able to be used with that embedded system 99. For example, the reprogramming device 102 compares the stored identification number with the embedded system identification number each time the two are coupled, and if a match is not detected, the reprogramming device 102 will not function with that embedded system 99.

In some embodiments, the hardware devices 112 of the reprogramming device 102 comprise one or more interchangeable external hardware connectors such that the reprogramming device is able to couple to multiple embedded systems 99 of varying origin. Allowing the use of a variety of external hardware connectors 112 enables the reprogramming device 102 to potentially communicate with embedded systems 99 from different manufacturers, or with systems of different generations within the same product family. In some embodiments, one or more of the external connectors 112 couple and communicate with the reprogramming device 102 through one or more of an internally mounted flexible wire connection, an internally mounted hard pin connection, and/or an externally attached wire cable connection.

In some embodiments, the reprogramming device 102 comprises hardware and/or software that enable the use of multiple different protocols such that the reprogramming device is able to communicate with multiple embedded systems 99 of varying origin. In some embodiments, the hardware 112 comprises one or more of line drivers of varying voltage, single line communication integrated circuit adapters, advanced network communication circuits, or other hardware. In some embodiments, implemented communication hardware is able to comprise: 5v universal asynchronous receiver/transmitter (UART), 12v UART, a K-Line of an on board diagnostics device, a controller area network bus (CAN-Bus), and/or other communication hardware. It is understood that the reprogramming device 102 is able to be designed to accommodate future communication protocols as they are developed.

In some embodiments, the reprogramming device 102 is designed to expedite the reprogramming and reconfiguration of embedded systems 99 over other means of reprogramming through the use of software. For example, the reprogramming device 102 is able to modify the boot loader of an embedded system 99 to accept larger amounts of data per singular write event. This modification comprises temporarily increasing the baud rate communication speed above standard during the reprogramming event as well as reducing the required instances of verification of the received data by the embedded system, typically by a factor of between eight and thirty-two. The reprogramming device 102 is also able to alter the checksum calculation routines to accept longer write streams between checksum calculations during reprogramming, typically extending the amount of data received prior to checksum calculation from between eight and sixteen bytes to between sixty-four and one-hundred-twenty-eight bytes, significantly reducing overall duration of the reprogramming process.

In some embodiments, the reprogramming device 102 is designed to alter embedded systems 99 through the use of software in order to facilitate real-time reprogramming during future reprogramming events. For example, after the initial use of the reprogramming device 102, the code contained within the embedded system 99 is able to be reconfigured in a semi-permanent manner through the use of modified communication subroutines and by enabling existing communication hardware with the embedded system 99 to allow the modification and retrieval of stored data and parameters while the embedded system 99 is still operating under its intended purpose. An example of this feature is able to include the addition to the embedded system's 99 code of a simple communication subroutine designed to constantly read from the embedded system's 99 existing UART or other, communication infrastructure without interrupting the current system operations, and to process the received information in a manner that permanently stores received information so that the information is able to be referenced and acted upon by one or more future processor operations. This capability is able to be an alternative to disabling the embedded system 99 while under the process of reprogramming, and subsequently returning the embedded system 99 to a useful state once reprogramming has completed.

In some embodiments, the reprogramming device 102 comprises software configured to facilitate the acquisition of information and stored internal parameters in real-time from the embedded system. In some embodiments, the software is incorporated into the reconfigure module. For example, after the initial use of the reprogramming device 102, the code contained within the embedded system 99 is able to be reconfigured through the use of modified communication subroutines and by enabling existing communication hardware with the embedded system 99 to allow the access and retrieval of internal memory and operating parameters, and to process the acquired information in such a manner as to be able to either store the information for future retrieval and processing, or to export the information to an external medium for viewing, processing or an alternative means of storage. An example of this feature is able to include the addition to the embedded system code of a simple communication subroutine designed to read registers of random access memory (RAM) and periodically transmit this information through the embedded system's existing UART, or other communication infrastructure, at a rate of between 8 and 512 transmissions per second.

Figure 2:
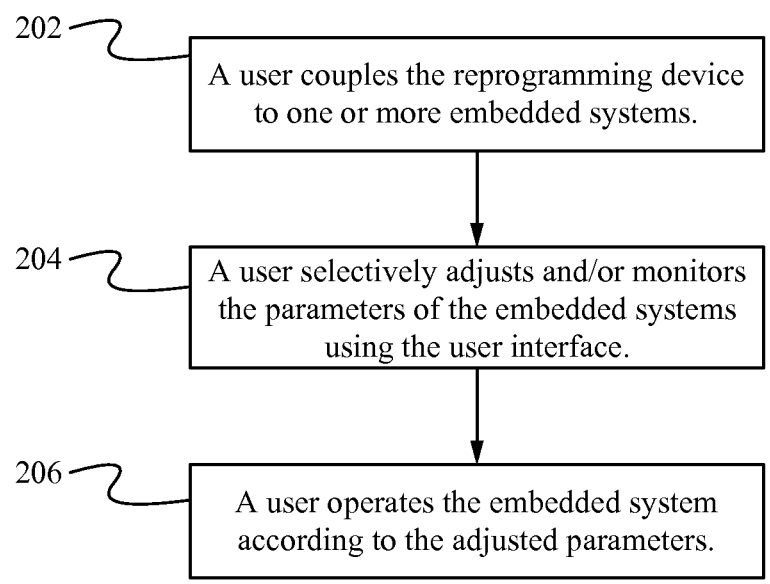
FIG. 2 illustrates a flow chart for a method of operation a reprogramming device according to some embodiments.

The operation of the reprogramming system 100 will now be discussed in conjunction with the flow chart 200 illustrated in FIG. 2 and described relative to FIG. 1. A user couples the reprogramming device 102 to one or more embedded systems 99 at the step 202. In some embodiments, the device 102 is coupled to the embedded systems 99 via embedded system interface 110 and/or the additional hardware 112. A user selectively adjusts and/or monitors the parameters of the embedded systems 99 using the user interface 108 at the step 204. In some embodiments, the embedded system 99 is deactivated before the reprogramming device 102 is used to reprogram the parameters. A user operates the embedded system 99 according to the adjusted parameters at the step 206. In some embodiments, the method further comprises the user selectively switching the state of the embedded system 99 between an initial state and an adjusted state utilizing the reprogramming device 102. In some embodiments, fewer or more steps are implemented. For example, the step of a user coupling the reprogramming device is able to be skipped by using an automatic coupling implementation. In another example, additional steps or sub-steps are implemented such as extracting information and sending instructions or other information. In some embodiments, transaction capabilities are modified as described herein. In some embodiments, some or all of the steps are performed automatically.

Figure 3:
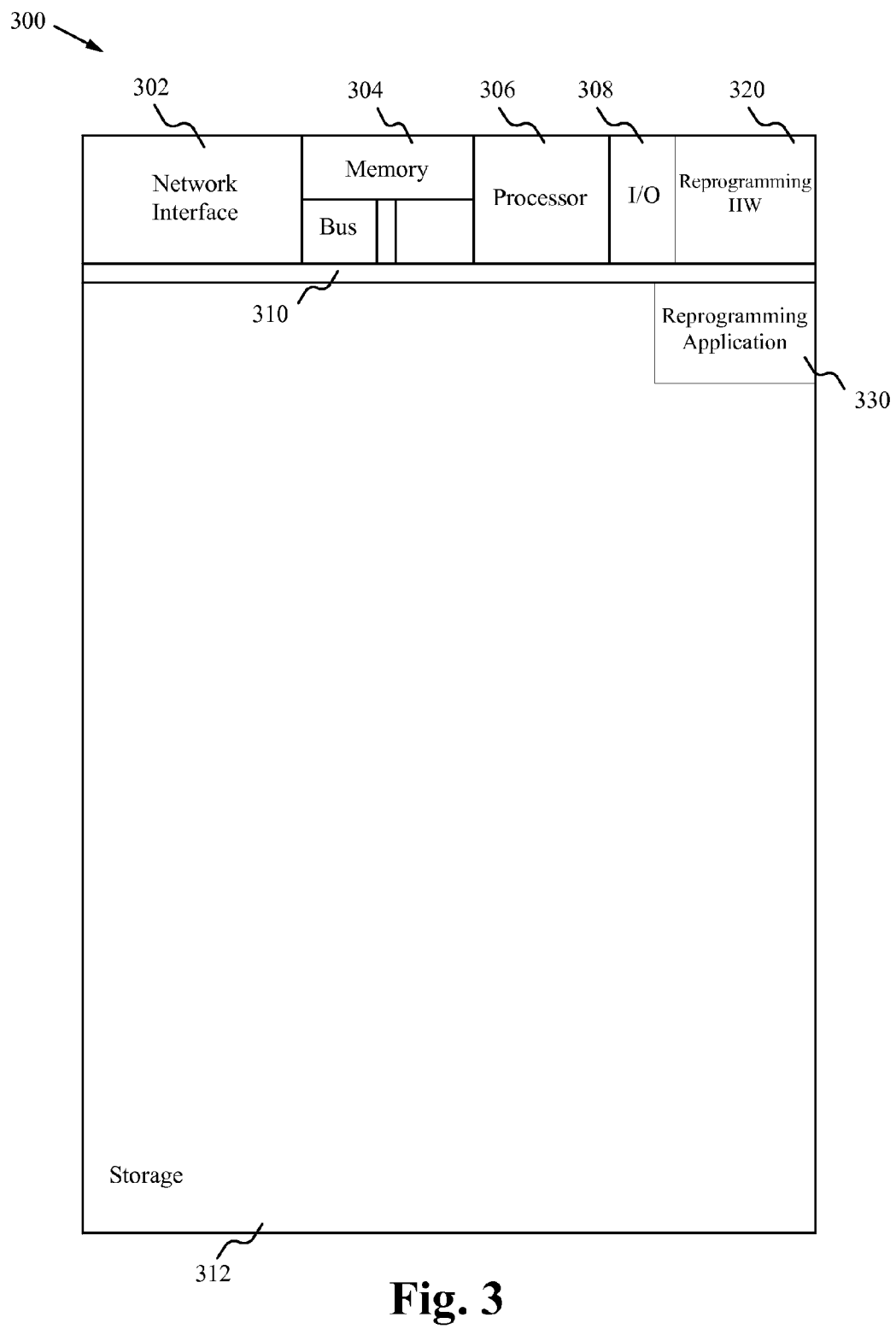
FIG. 3 illustrates a block diagram of an exemplary computing device configured to implement the reprogramming method according to some embodiments.

FIG. 3 illustrates a block diagram of an exemplary computing device 300 configured to implement the reprogramming method according to some embodiments. The computing device 300 is able to be used to acquire, store, compute, process, communicate and/or display information. In general, a hardware structure suitable for implementing the computing device 300 includes a network interface 302, a memory 304, a processor 306, I/O device(s) 308, a bus 310 and a storage device 312. The choice of processor is not critical as long as a suitable processor with sufficient speed is chosen. The memory 304 is able to be any conventional computer memory known in the art. The storage device 312 is able to include a hard drive, CDROM, CDRW, DVD, DVDRW, flash memory card or any other storage device. The computing device 300 is able to include one or more network interfaces 302. An example of a network interface includes a network card connected to an Ethernet or other type of LAN. The I/O device(s) 308 are able to include one or more of the following: keyboard, mouse, monitor, display, printer, modem, touch-screen, button interface, a device-specific coupling cable, a universal coupling cable and other devices. In some embodiments, the hardware structure includes multiple processors and other hardware to perform parallel processing. Reprogramming application(s) 330 used to perform the reprogramming are likely to be stored in the storage device 312 and memory 304 and processed as applications are typically processed. More or less components shown in FIG. 3 are able to be included in the computing device 300. In some embodiments, reprogramming hardware 320 is included. Although the computing device 300 in FIG. 3 includes applications 330 and hardware 320 for implementing the reprogramming method, the reprogramming method is able to be implemented on a computing device in hardware, firmware, software or any combination thereof. For example, in some embodiments, the reprogramming applications 330 are programmed in a memory and executed using a processor. In another example, in some embodiments, the reprogramming hardware 320 is programmed hardware logic including gates specifically designed to implement the method.

In some embodiments, the reprogramming application(s) 330 include several applications and/or modules. Modules include a user interface module for displaying a user interface and receiving and sending information such as instructions and stored data, a boot loader module for modifying a boot loader of the embedded system to accept larger amounts of data per singular write event, a baud rate module for temporarily increasing a baud rate communication speed during a reprogramming event, a verification module for reducing required instances of verification of received information, a checksum module for altering checksum calculation routines to accept longer write streams between checksum calculations during reprogramming and a use module for limiting the use of the reprogramming device to a single use, multiple uses or any other use scheme. In some embodiments, modules include one or more sub-modules as well. In some embodiments, fewer or additional modules are able to be included.

Examples of suitable computing devices include a personal computer, a laptop computer, a computer workstation, a server, a mainframe computer, a handheld computer, a personal digital assistant, a cellular/mobile telephone, a smart phone such as an iPhone®, a smart appliance, a tablet device such as an iPad®, or any other suitable computing device.

To utilize the reprogramming device, a user couples the reprogramming device to one or more embedded systems, for example in a motorcycle. The user selectively adjusts and/or monitors the parameters of the embedded systems using a user interface. The user selectively switches the state of the embedded system between an initial state and an adjusted state utilizing the reprogramming device.

In operation, the reprogramming device is able to reprogram microprocessors and/or integrated memory storage devices such as vehicle on-board computer systems. The reprogramming device enables a user to monitor and/or adjust parameters of the embedded systems. For example, utilizing the reprogramming device a motorcycle user is able to couple the reprogramming device to a motorcycle's on-board computer and adjust the parameters in order to increase the performance of the motorcycle. Examples of such parameters are horsepower, speed, rpm, torque, fuel economy parameters, emissions parameters and internally stored variables. The reprogramming device expedites the reprogramming and reconfiguration of embedded systems over other means of reprogramming through the use of software.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A device for reprogramming an embedded system on a vehicle comprising:
   a. a memory for storing an application, the application configured for:
      i. presenting a user interface configured for displaying initial embedded system information and receiving an instruction;
      ii. extracting the initial embedded system information contained on the embedded system;
      iii. sending the instruction to the embedded system;
      iv. reprogramming the initial embedded system information on the embedded system in response to the instruction forming reprogrammed embedded system information; and
      v. writing a unique identification code to the embedded system to allow an initial reprogramming and preventing any additional reprogramming except to return the embedded system information to the initial embedded system information or to the reprogrammed embedded system information; and
   b. a processing component coupled to the memory, the processing component configured for processing the application.

2. The device of claim 1 wherein the application utilizes an embedded system interface for sending the instruction to the embedded system and extracting the initial embedded system information.

3. The device of claim 1 wherein the application is further for increasing transaction capabilities between the embedded system and the device for reprogramming.

4. The device of claim 1 wherein the device is portable.

5. The device of claim 1 wherein the device is releasably coupled to the embedded system.

6. The device of claim 1 wherein the device is permanently coupled to the embedded system.

7. The device of claim 1 wherein the embedded system comprises a motorcycle on-board computing system.

8. The device of claim 1 wherein the embedded system information is selected from the group consisting of horsepower, speed, rpm, torque, fuel economy parameters, emissions parameters and internally stored variables.

9. The device of claim 1 wherein the application is further for modifying a boot loader of the embedded system to accept larger amounts of data per singular write event.

10. The device of claim 1 wherein the application is further for temporarily increasing a baud rate communication speed during a reprogramming event.

11. The device of claim 1 wherein the application is further for reducing required instances of verification of received information.

12. The device of claim 1 wherein the application is further for altering checksum calculation routines to accept longer write streams between checksum calculations during reprogramming.

13. A device for reprogramming an embedded system on a vehicle comprising:
   c. a memory for storing an application, the application configured for:
      i. presenting a user interface configured for displaying initial embedded system information and receiving an instruction;
      ii. increasing transaction capabilities between the embedded system and the device for reprogramming by modifying a boot loader of the embedded system to accept larger amounts of data per singular write event;
      iii. extracting the initial embedded system information contained on the embedded system using an embedded system interface;
      iv. sending the instruction to the embedded system using the embedded system interface;
      v. reprogramming the initial embedded system information on the embedded system in response to the instruction forming reprogrammed embedded system information;
      vi. writing a unique identification code to the embedded system to allow an initial reprogramming and preventing any additional reprogramming except to return the embedded system information to the initial embedded system information or to the reprogrammed embedded system information; and
   d. a processing component coupled to the memory, the processing component configured for processing the application.

14. The device of claim 13 wherein the device is portable.

15. The device of claim 13 wherein the device is releasably coupled to the embedded system.

16. The device of claim 13 wherein the device is permanently coupled to the embedded system.

17. The device of claim 13 wherein the embedded system comprises a motorcycle on-board computing system.

18. The device of claim 13 wherein the embedded system information is selected from the group consisting of horsepower, speed, rpm, torque, fuel economy parameters, emissions parameters and internally stored variables.

19. The device of claim 13 wherein the application is further for temporarily increasing a baud rate communication speed during a reprogramming event.

20. The device of claim 13 wherein the application is further for reducing required instances of verification of received information.

21. The device of claim 13 wherein the application is further for altering checksum calculation routines to accept longer write streams between checksum calculations during reprogramming.

22. A method of reprogramming an embedded system on a vehicle, the method programmed in a memory of a reprogramming device comprising:
   e. presenting a user interface configured for displaying initial embedded system information and receiving an instruction;
   f. increasing transaction capabilities between the embedded system and the reprogramming device by modifying a boot loader of the embedded system to accept larger amounts of data per singular write event;
   g. extracting the initial embedded system information contained on the embedded system using an embedded system interface;
   h. sending the instruction to the embedded system using the embedded system interface;
   i. reprogramming the initial embedded system information on the embedded system in response to the instruction forming reprogrammed embedded system information; and
   j. writing a unique identification code to the embedded system to allow an initial reprogramming and preventing any additional reprogramming except to return the embedded system information to the initial embedded system information or to the reprogrammed embedded system information.

23. The method of claim 22 wherein the device is portable.

24. The method of claim 22 wherein the device is releasably coupled to the embedded system.

25. The method of claim 22 wherein the device is permanently coupled to the embedded system.

26. The method of claim 22 wherein the embedded system comprises a motorcycle on-board computing system.

27. The method of claim 25 wherein the embedded system information is selected from the group consisting of horsepower, speed, rpm, torque, fuel economy parameters, emissions parameters and internally stored variables.

28. The method of claim 22 further comprising temporarily increasing a baud rate communication speed during a reprogramming event.

29. The method of claim 22 further comprising reducing required instances of verification of received information.

30. The method of claim 22 further comprising altering checksum calculation routines to accept longer write streams between checksum calculations during reprogramming.

* * * * *